Figures 1, 2:
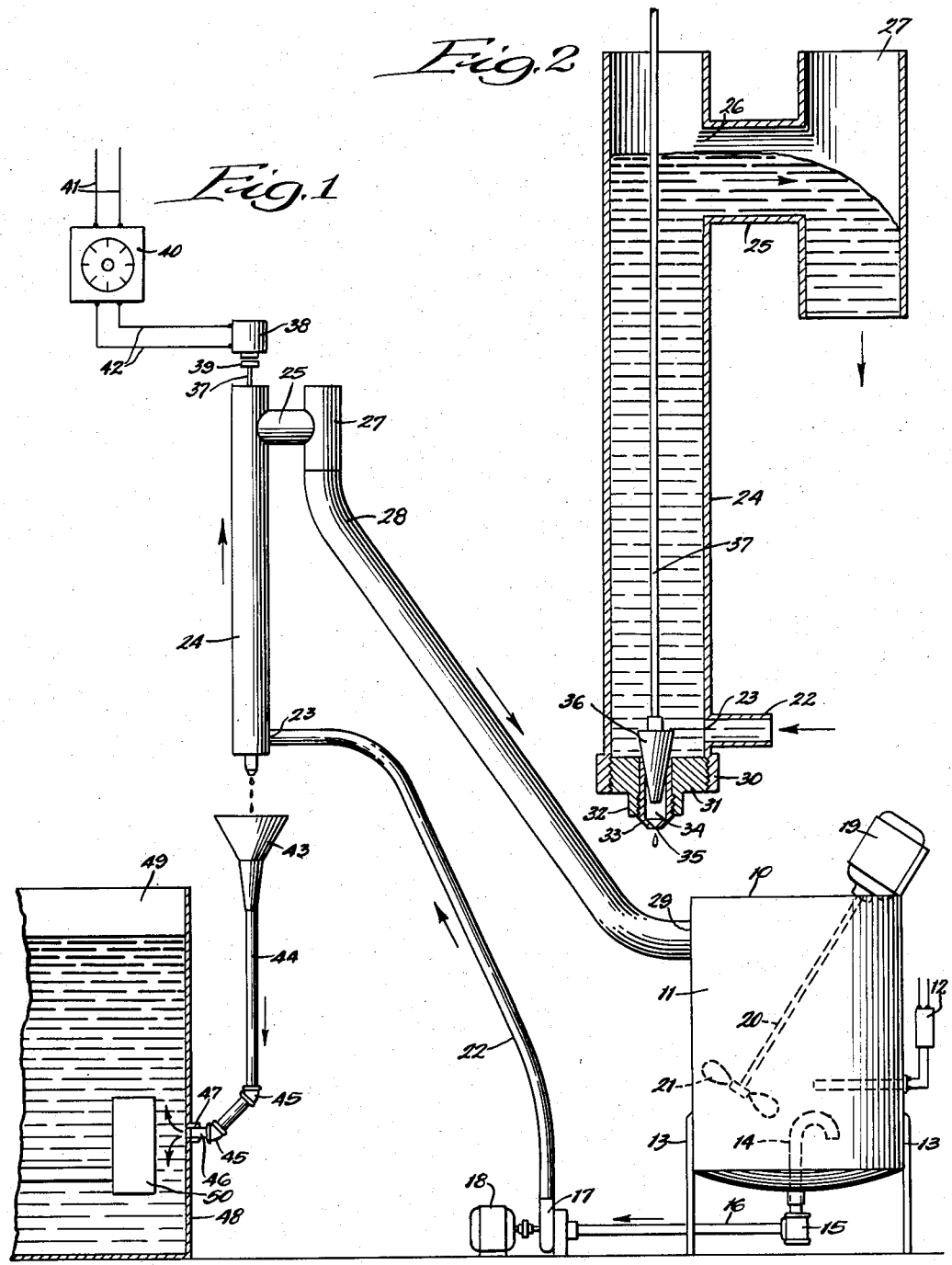

May 1, 1956 — J. P. LAWLOR — 2,743,909

SLURRY FEEDER

Filed Aug. 25, 1953

INVENTOR:
Joseph P. Lawlor,
BY Dawson, Tilton & Graham,
ATTORNEYS.

2,743,909

SLURRY FEEDER

Joseph P. Lawlor, Ames, Iowa

Application August 25, 1953, Serial No. 376,500

8 Claims. (Cl. 259—42)

This invention relates to a slurry feeder and more particularly to apparatus and a method for feeding a uniform mixture of slurry to a mixing chamber or reaction tank at a uniform feed rate.

Generally in apparatus wherein a slurry is used, the slurry is prepared in a slurry tank by placing in the tank the required proportions of dry mix and liquid to provide the semi-fluid slurry. The slurry is then fed to a mixing chamber at a controlled flow rate (it has not been, however, heretofore possible to accurately control the flow rate) to add the required amounts of slurry to the mixing chamber. The mixing chamber or reaction tank may have various forms and these terms are used herein broadly. For example, slurry feeds are used with swimming pools, water conditioning systems such as water softeners and other water treating apparatus, in a number of industrial applications, etc.

A problem has long existed in this field in that it has been virtually impossible to control or regulate the slurry feed with any acceptable degree of accuracy. A slurry is a semi-fluid wherein solids are suspended in a liquid carrier and when the slurry is fed to a mixing chamber, the slurry or solids therein tend to collect or cake in the flow system and block it, which of course, disturbs the flow rate and the accuracy of the slurry feed is upset. The collecting and caking problem is especially pronounced during periods of interrupting flow and occurs regardless of the flow apparatus used. Check valves, diaphragm valves, and similar structures are particularly prone to be quickly blocked or stopped up by the slurry. Also, the slurry solids tend to settle to the bottom and collect in the lower area of any chamber in the feed system.

In an effort to avoid this difficult problem, resort has been made to dry feeders and gravimetric feeders. This has provided no solution, however, because the dry materials used in slurry preparations are affected by weather conditions and as the humidity rises, the material seems to stick together more and the rate of flow in the dry feeder is thereby changed. Gravimetric feeders are also inaccurate, since the dry material takes up moisture, thereby upsetting the weight determinations.

It is accordingly an object of this invention to provide a method and apparatus for feeding a slurry preparation to a mixing chamber at a relatively accurate feed rate. Another object of the invention is to provide apparatus wherein a feed slurry is fed at a relatively accurately regulated rate while preventing the collection and caking of slurry at critical points in the apparatus. Still another object is in providing a wet slurry feed wherein a feed control valve is provided that is continuously washed by the slurry to prevent collection and caking of the slurry thereon, and wherein the slurry is fed to a mixing chamber under a substantially constant pressure head for accurately controlling the feed rate. A further object is in the provision of a wet slurry feeder system in which a valve equipped constant pressure head vessel is provided, and a uniform mixture of slurry is fed into the vessel while being directed against the discharge valve thereof to wash the valve and prevent slurry from caking thereon; the valve being automatically controlled to release slurry to a mixing chamber in response to the demands of the valve control; and an overflow pipe from the vessel to the slurry tank being provided to maintain a constant head in the vessel. Additional objects and advantages will appear as the specification proceeds.

An embodiment of the invention is illustrated in the accompanying drawings in which—

Figure 1 is a largely diagrammatic view of a slurry feed system embodying my invention; and Fig. 2 is a longitudinal sectional view of the constant pressure head vessel and showing the control valve therefor.

In the drawings a slurry tank is indicated at 10 and provides a chamber 11 therein adapted to receive a dry slurry material and a liquid such as water. The water may be delivered to the chamber 11 through an inlet conduit 12. Preferably, the tank 10 is supported on standards 13 so that it is raised above the ground. An arcuate draw-off conduit 14 extends into the chamber 11 through the bottom wall of the tank and is connected externally of the tank to a feeder 15 which is in open communication with a flow conduit 16 that provides an inlet for a centrifugal pump 17 actuated by motor 18.

Preferably, a mixer is provided within the chamber 11 for maintaining a uniform slurry mixture therein. If desired, the mixer may be provided by a motor 19 equipped with an elongated shaft 20 projecting downwardly and angularly into the chamber 11 and having at its lower end a propeller 21 with blades that are operative to agitate the slurry within the tank when the motor 19 is energized. The motor 19 may be supported in any suitable manner and for example, may be welded or bolted, etc. to the sides or top of the slurry tank 10.

Communicating with the outlet of the centrifugal pump 17 is a flow conduit 22 that at its upper end is in open communication with an inlet port 23 provided at the lower end of a feed control vessel or constant pressure head vessel 24. The vessel 24 is elongated and is equipped at its upper end with an overflow conduit 25 that communicates with the vessel 24 through an overflow port 26 therein as is best seen in Fig. 2. At its opposite end, the overflow conduit 25 is in open communication with a generally vertical fitting 27 that substantially parallels the constant pressure head vessel 24 and that receives at its lower end an overflow return conduit 28 connecting at its opposite end with the slurry tank 10 through a port 29 provided adjacent the top thereof.

As is seen best in Figure 2, the vessel 24 has a reinforced lower end 30 equipped with internal threads that threadedly receives therein a closure block 31 having a depending central portion 32 and having also an axially extending bore therethrough. The lower end of the bore adjacent the depending portion 32 is equipped with threads and threadedly receives a discharge tube 33 having an axially extending passage 34 therethrough that terminates in a reduced discharge port 35.

A frusto conical valve 36 is adapted to extend into the discharge tube 33 and to provide a closure therefor as is shown in Fig. 2. At its upper enlarged end the valve 36 is rigidly secured to an elongated valve stem 37 that extends upwardly through the vessel 24 and that is operatively arranged at its upper end with a solenoid 38. When the solenoid is actuated, the magnetic field provided thereby is adapted to draw the annular flange 39 and stem 37 connected thereto upwardly to open the discharge tube 33.

The solenoid is controlled by any suitable control instrument 40. For example, the flow control instrument 40 may be a timer that actuates the solenoid 38 at desired intervals to open the valve 36, or it may be a flow meter, a pH control meter, or any other similar device that is operative to open the valve 36 at desired times. In the specific illustration given the control instrument 40 is a clock timer that is connected to an external power source through leads 41 and to the solenoid 38 through leads 42. At predetermined times the control 40 completes the circuit through the solenoid 38 which energizes the same and opens the valve 36.

As is seen in Fig. 1, the discharge tube 33 is aligned centrally with a funnel 43 connected at its lower end to a flow conduit 44 having elbows 45 therein and an outwardly projecting end portion 46 sealably received within an annular port 47 provided in the side wall 48 of the reaction tank or mixing tank 49. If desired, a baffle 50 may be provided in the tank 49 in front of the port 47 to disperse the slurry mixture being fed to the tank.

It will be apparent that the specific arrangement illustrated to conduct the slurry from the vessel 24 to the interior of the reaction tank 49 may be varied considerably and is set out simply as being exemplary of the number of arrangements that might be used. Similarly, all different forms of mixing chambers or reaction tanks 49 may be employed. As has been heretofore indicated, the reaction tank may have any number of forms and may be used in a vast number of different applications.

The slurry prepared in the chamber 11 of the slurry tank may be any of the usual slurry feeds. For example, it may be provided by a mixture of lime and water, diatomite and water, or any other suitable slurry preparations.

Operation

In operation liquid and a dry slurry mix are fed into the tank 10 and the resulting mixture agitated by the fan blades 21. The motor 18 is energized and rotates the centrifugal pump 17 which draws the uniform mixture or slurry from the chamber 11 and forces it upwardly through the conduit 22 into the constant pressure head vessel 24. The vessel 24 fills and overflows through the conduit 25 and the overflow material is returned to the chamber 11 through the return conduit 28. It is apparent that the overflow maintains the level of the slurry within the vessel 24 at a relatively constant elevation and therefore a substantially constant pressure head is provided.

In response to the demands indicated by the control member 40, the solenoid 38 is appropriately energized to raise the valve 36 and permit the slurry to drain through the tube 33 and into the funnel 43 where it is then conducted into the reaction tank 49. The valve 36 will be appropriately opened and closed as the control member 40 may require.

By referring to Figure 2 it will be seen that the flow conduit 22 and the inlet port 23 of the vessel 24 are adjacent the lower end thereof and are in substantial alignment with the valve 36. Therefore, as slurry is pumped through the conduit 22, it is directed toward and sprays against the valve 36 to constantly wash the same and thereby prevent slurry from collecting and caking thereon. This continuous washing of the valve 36 is important, for the tendency of the slurry to collect and cake on valve members has been one of the primary difficulties in apparatus heretofore known. It will be appreciated that if the slurry collects on the valve and discharge port, that the functioning of the valve and port would be disrupted and the flow rate provided thereby will be substantially upset. By continuously washing the valve with the slurry that is directed thereagainst, the valve is kept clean and free of slurry collections thereon and functions normally and in the required manner at all times to provide a uniform flow rate.

Since slurry consists essentially of a suspension of solids in a liquid carrier, there would be considerable tendency for the solids to settle downwardly within the constant pressure head 24 or any other vessel to which the slurry might be delivered. The further advantage is realized then by delivering the slurry to the constant pressure head vessel 24 at the bottom thereof and having an overflow at the top thereof of constantly circulating the slurry upwardly in the vessel 24 which is effective to prevent the settling of the slurry solids within the vessel.

The discharge port for the vessel 24 is arranged so that it is quite small in relation to the quantity of slurry being pumped into the vessel by the pump 17 and through the conduit 22. That is to say, the discharge port for the vessel 24 is so small in relation to the quantity of slurry being delivered to the vessel that the amount of slurry drawn off therefrom is negligible in relation to the slurry delivered to the vessel. Therefore the pressure head within the vessel 24 remains substantially unchanged during the time that the valve 36 is lifted to free the port or discharge orifice and permit slurry to drain from the vessel. The maintenance of a constant pressure head is important for it results in a relatively constant rate of slurry feed and accurate control of the slurry feed has not heretofore been possible. In actual tests conducted with the apparatus herein illustrated and described the flow rate of the slurry has been controlled to better than within 2% accuracy and this is a substantial gain over slurry feeds heretofore known.

It will be apparent that while the invention has been described for the most parts with specific reference to the structure illustrated, that the invention also includes the method of feeding slurry, and it is belived that the method is apparent from the description that has been set out.

While in the foregoing specification embodiments of the invention have been set out in considerable detail for purposes of illustration, it will be apparent to those skilled in the art that considerable deviation may be made from these details without departing from the spirit and principles of the invention.

I claim:

1. In slurry feed apparatus, a slurry tank, a constant pressure head vessel equipped with an overflow and a discharge port spaced therebelow, means for feeding slurry to said vessel at a flow rate substantially greater than the rate of flow of the slurry through said discharge port, whereby the level of the slurry in said vessel is maintained at a relatively constant elevation with the result that a substantially constant pressure head is provided at said discharge port and a valve arranged with said discharge port for controlling the flow of slurry therethrough, said vessel having also an inlet port adjacent said discharge port and in substantial alignment with said valve, said inlet port receiving slurry from said slurry feeding means, the flow of slurry through said inlet port from said slurry feeding means being effective to wash said valve with the result that the caking of slurry thereon is prevented.

2. In slurry feed apparatus, a slurry tank, a feed control vessel adapted to control the flow of slurry from said tank to a mixing chamber, said vessel being provided with a discharge port, a valve arranged with said port for controlling the flow of slurry therethrough, said vessel having also an inlet port adjacent said discharge port and in substantial alignment with said valve, and means for feeding slurry from said tank to said inlet port, the flow of slurry through said inlet port being effective to wash said valve with the result that the caking of slurry thereon is prevented.

3. The structure of claim 1 in which a pump and conduit means are provided for feeding slurry from said tank to said inlet port.

4. The structure of claim 2 in which automatic control means for automatically regulating said valve are provided.

5. The structure of claim 2 wherein an agitator is provided in said slurry tank for maintaining a uniform mixture of slurry therein.

6. In slurry feed apparatus, a slurry tank, a constant pressure head vessel equipped with an overflow and a discharge port spaced therebelow, a valve arranged with said port for controlling the flow of slurry therethrough, said vessel having also an inlet port adjacent said discharge port and oriented to direct slurry against said valve, and means for feeding slurry to said inlet port at a flow rate substantially greater than the rate of flow of slurry through said discharge port when said valve is open, the flow of slurry through said inlet port being directed against said valve and effective to wash said valve with the result that the caking of slurry thereon is prevented.

7. The structure of claim 6 in which a return feed conduit is provided and is in open communication with said overflow and with said slurry tank adjacent the upper end thereof, and an agitator is provided in said slurry tank for maintaining a substantially uniform mixture of slurry therein.

8. In a method of feeding a wet slurry to a mixing chamber, the steps of providing a wet slurry, providing a constant pressure head vessel equipped with a valve-controlled port and an overflow spaced thereabove, flowing the slurry into said vessel at a flow rate substantially greater than the rate of discharge of slurry through said port when said valve is open, and directing the flow of slurry against the valve to continually wash the same.

References Cited in the file of this patent

UNITED STATES PATENTS

| | | |
|---|---|---|
| 1,082,287 | Schaffer | Dec. 23, 1913 |
| 1,109,768 | Laux | Sept. 8, 1914 |
| 1,625,592 | Conant | Apr. 19, 1927 |
| 2,073,779 | Bramsen | Mar. 16, 1937 |
| 2,384,912 | Helin | Sept. 18, 1945 |
| 2,392,026 | Cram | Jan. 1, 1946 |
| 2,562,536 | Mayer | July 31, 1951 |
| 2,611,643 | Higgins | Sept. 23, 1952 |

FOREIGN PATENTS

| | | |
|---|---|---|
| 1,036,662 | France | Apr. 29, 1953 |